Jan. 10, 1967    H. B. ROBINSON    3,297,355
PICK-UP TRUCK WITH REMOVABLE LIVING QUARTERS
Filed Oct. 19, 1964    2 Sheets-Sheet 1

INVENTOR
HAROLD B. ROBINSON

BY Seidel & Gonda

ATTORNEYS.

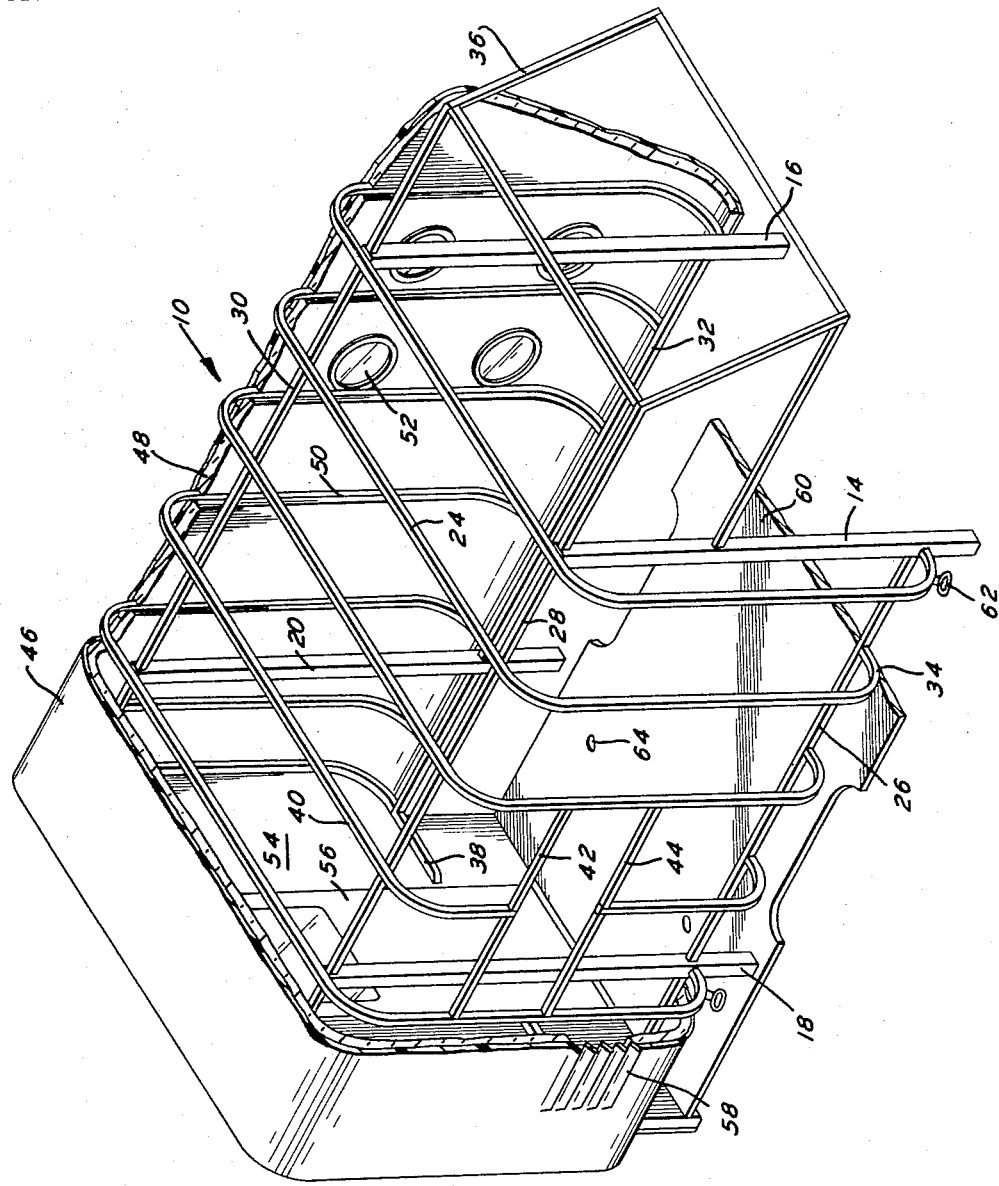

United States Patent Office 3,297,355
Patented Jan. 10, 1967

3,297,355
PICK-UP TRUCK WITH REMOVABLE
LIVING QUARTERS
Harold B. Robinson, 6600 N. Broad St.,
Jenkintown, Pa. 19046
Filed Oct. 19, 1964, Ser. No. 404,678
4 Claims. (Cl. 296—23)

This invention relates to a pick-up truck provided with a removable housing adapted to be used as living quarters.

There has long been a need for a vehicle which can be used to house on site construction and repair personnel. A vehicle which would be ideal for such a purpose would be one which would house the personnel while in the field or enroute to a construction site while still being capable of performing heavy duty hauling operations at the site. This invention deals with such a vehicle.

Accordingly, it is an object of this invention to provide a vehicle having removable living quarters.

Another object of this invention is to provide a pick-up truck with a removable housing adapted to serve as living quarters.

Still another object of this invention is to provide a pick-up truck with a housing adapted to serve as living quarters in or enroute to the field and which can be removed in the field for allowing the pickup truck to perform its normal hauling functions.

A still further object of this invention is to provide a pick-up truck which can be economically converted into a home on wheels.

Other objects will appear from the disclosures which follows hereinafter.

For the purpose of illustrating the invention, there is shown in the drawings a form which is presently preferred; it being understood, however, that this invention is not limited to the precise arrangements and instrumentalities shown.

FIGURE 3 is a perspective view of the removable housing of the vehicle with portions of its covering broken away to illustrate its frame construction.

Figure 1:
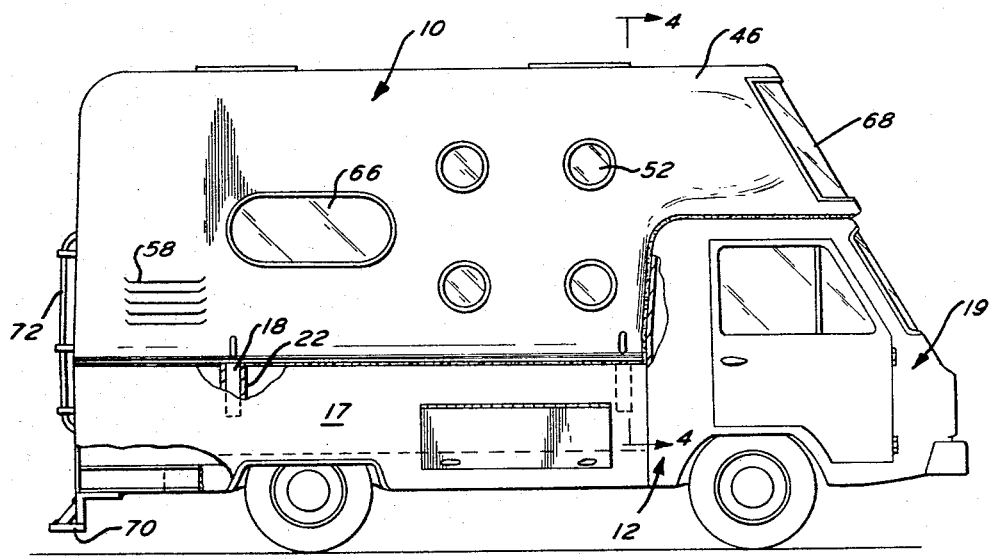
FIGURE 1 is a side view in elevation of the vehicle comprising the subject matter of the instant invention.
Figure 2:
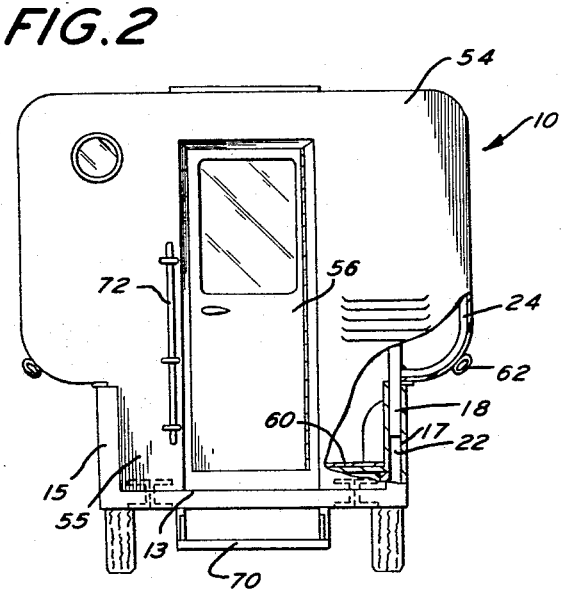
FIGURE 2 is an end view in elevation of the vehicle illustrated in FIGURE 1.
Figure 4:
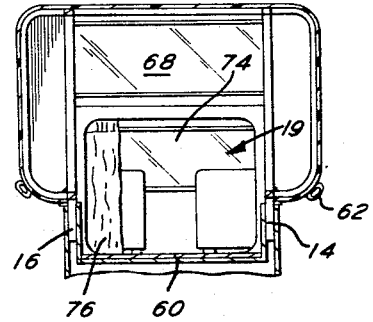
FIGURE 4 is a cross-sectional view taken substantially along the plane indicated by the line 4—4 of FIGURE 1.

The vehicle comprising the subject matter of the instant invention includes a removable housing 10 attached to a pick-up truck 12. The pick-up truck 12 is basically of standard design and includes a bed 13 having a pair of parallel side walls 15 and 17. A motorized cab 19 is attached to the side walls and bed.

A pair of vertically extending pockets 22 are formed in each of the side walls 15 and 17 of the truck 12. Their purpose will be made apparent hereinafter.

The housing attachment 10 includes a first pair of longitudinally extending parallel beams 28 and 30 defining a horizontal plane. Vertically spaced from the plane defined by the beams 28 and 30 is a second horizontal plane defined by a second pair of longitudinally extending beams 26 and 32. A plurality of U-shaped frame members 24 connect these beam pairs and occupy horizontally spaced, parallel vertical planes. Each of the U-shaped frame members 24 includes an arcuately bowed portion 34 adjacent its jointure to the beams 26 and 32.

A first pair of parallel, upright beams 14 and 16 are connected to the first U-shaped frame member 24 and the longitudinally extending beams 26, 28, 30, and 32. Similarly, a second pair of parallel, upright beams 18 and 20 are connected to a succeeding U-shaped frame member 24 and each of the longitudinally extending beams. The lower portions of each of the upright beams projects beyond the plane defined by the parallel beams 26 and 32.

Connected to the upright beams 14 and 16 and projecting forwardly from the series of U-shaped frame members 24 is a box-like frame 36. The frame 36 includes a rectangular front which is inclined with respect to the horizontal towards the rear of the housing 10. The box-like frame 36 has a height which is approximately one-half the height of the U-shaped frame members 24.

Each of the longitudinally extending frame members 26 and 32 include a short perpendicular leg 38 joined to the rear end thereof. A back closure member 54 is adapted to be secured to the last U-shaped frame member 24 and the horizontally extending legs 38 to form a closure for the back end of the housing attachment 10.

The back closure member 54 includes an extension 55 projecting a substantial distance below the horizontal plane defined by the beams 26 and 32. Secured to the bottom of the extension 55 and projecting towards the forward end of the housing is a floor element 60. The floor element 60 is connected to the beams 26 and 32 in any conventional fashion to form an integral structure.

One of the intermediate U-shaped frame members 40 has one of its legs interrupted as shown in FIGURE 3. A pair of longitudinally extending frame members 42 and 44 are connected to the interrupted portion of the frame member 40 and are connected at their ends to the adjacent U-shaped frame members. The space between the frame members 42 and 44 forms the outline of a window as will subsequently be made clear.

The U-shaped frame members 24 are covered with a layer of insulation 48. A suitable material which can be used is fiberglass. Grooves 50 are cut in the insulation material 48 for receiving each U-shaped frame member 24. The insulation layer 48 may then be riveted to the frame members 24. A light, weather-resistant layer 46 is then secured to the insulation layer 48.

The top and sides of the box-like frame 36 are also covered with insulation 48 and a weather-resistant layer of material 46. An opening is cut in the coverings 46 and 48 adjacent the inclined front portion of the box-like frame 36. A window 68 is secured to the covering and front portion of the box-like frame. Similarly, an opening is cut in the coverings 46 and 48 adjacent the longitudinally extending frame members 42 and 44. A window 66 is adapted to be secured to the coverings and the frame members 42 and 44. Other windows, such as shown at 52 are adapted to be formed in the covering materials.

A rectangular opening is adapted to be cut in the back closure member 54 and extension 55. A door 56 is hinged to the back closure member for closing the cut opening.

In assembling the housing attachment 10 with a pick-up truck 12, the integral housing is lowered from above the pick-up truck onto the bed 13. The portions of the beams 14, 16, 18 and 20 which project beyond the horizontal plane defined by the beams 26 and 32 are placed within the pockets 22 formed in the side walls 15 and 17 of the truck 12. The bowed portions 34 of the U-shaped frame members 24 are supported by the top edges of the side walls 15 and 17. The floor element 60 is constructed at a distance below the horizontal plane defined by the beams 26 and 32 so as to precisely seat upon the bed 13 of the pick-up truck. The floor element 60 is provided with apertures 64 for receiving fasteners for fastening the housing 10 to the bed of the pick-up truck. The bottom of the box-like frame 36 will seat on top of the cab 19. This provides extra space within the housing attachment 10.

A step can be provided adjacent the rear of the bed 13. A hand rail 72 may be secured to the back closure element 54 adjacent the door 56. Hence, to enter the housing 10, one need only to step upon the step 70, grasp the hand rail 72, open the door 56 and enter the housing.

Ventilation slots such as 58 may be cut in the covering materials 46 and 48 for ventilating the interior of the housing.

When the vehicle is in motion, occupants of the cab 19 may enter the housing 10 through an opening 74 formed in the back wall of the cab. If the housing 10 is removed, a curtain 76 is adapted to be pulled across the opening 74 to close it. By the use of such an arrangement, the back door 56 may be eliminated.

If desired, cabinets can be permanently fitted to the framework. However, they may be loosely installed if the living quarters will be put to use while the truck is immobile. The space on top of the cab is ideally suited to be used for sleeping. A mattress may be placed on the cab top.

Eye members 62 may be secured to the bowed portions 34 of the U-shaped frame. Ropes may be threaded through the eye members 62 for hoisting the attachment 10 from the truck 12.

It will be apparent that the pick-up truck 12 may perform its normal functions in hauling loads by simply removing the housing 10. This is easily accomplished on site by unbolting the floor 60 from the bed 13 of the pick-up truck 12 and lifting the housing 10 vertically until the beams 14–20 clear the pockets 22.

The present invention may be embodied in other specific forms without departing from the spirit or essential attributes thereof and, accordingly, reference should be made to the appended claims, rather than to the foregoing specification as indicating the scope of the invention.

I claim:

1. A pick-up truck including a horizontal bed, a pair of side walls on said bed, each of said side walls having a pair of upstanding legs, said upstanding legs defining an opening therebetween, vertically extending pockets in each of said side walls defined by said upstanding legs and further structural members extending between said legs of said side walls, a cab attached to one end of said bed and said side walls, a housing adapted to be removably mounted on said pick-up truck to form an enclosed shelter, said housing comprising a frame, said frame including a first pair of parallel, longitudinally extending beams, a second pair of parallel longitudinally extending beams, said first and second pair of beams lying in vertically spaced, substantially horizontal planes, a series of generally U-shaped structural elements, said U-shaped structural elements connecting said beam pairs and occupying horizontally spaced, parallel, vertical planes, said U-shaped structural elements being securely connected to the lower of said two beam pairs, a covering for said frame secured to said U-shaped structural elements, a floor element supported by said frame below the plane defined by the lower of said two beam pairs, means in said floor element for removably receiving fasteners for securing said floor element to the bed of said truck, said frame further including vertically depending structural elements slidably received within the pockets in said side walls so that said structural elements are supported by the upstanding legs of said side walls and the structural members extending therebetween, and a frame portion projecting from one end of said frame and supported upon the top of said cab.

2. A pick-up truck as set forth in claim 1 wherein said housing includes a covering for said frame secured to said U-shaped structural elements, said covering including an insulation layer and a weather-resistant layer, said insulation layer having grooves for receiving said U-shaped structural elements.

3. A pick-up truck as set forth in claim 1 wherein the end of the frame below the frame portion which is supported by the cab is open to permit ready access to the interior of said housing.

4. A pick-up truck as set forth in claim 1 wherein each of said U-shaped members has a bowed portion and eye members secured to the bowed portions of the said U-shaped frame for facilitating removal and mounting of the housing upon the truck.

References Cited by the Examiner

UNITED STATES PATENTS

| D. 189,395 | 12/1960 | Fogelsonger | 296—23 |
| 1,609,311 | 12/1926 | Rosenblatt | 296—39 |
| 2,173,076 | 9/1939 | Stetson | 296—23 |
| 2,307,172 | 1/1943 | Vanhooser | 296—10 X |
| 3,145,046 | 8/1964 | Orn | 296—23 |

MILTON BUCHLER, *Primary Examiner.*

BENJAMIN HERSH, *Examiner.*

P. GOODMAN, *Assistant Examiner.*